(12) United States Patent
Peng et al.

(10) Patent No.: US 12,439,694 B2
(45) Date of Patent: Oct. 7, 2025

(54) TFT-LCD FLOAT GLASS SUBSTRATE PROCESSING LINE

(71) Applicants: BENGBU CHINA OPTOELECTRONIC TECHNOLOGY CO., LTD, Bengbu (CN); CNBM RESEARCH INSTITUTE FOR ADVANCED GLASS MATERIALS GROUP CO., LTD, Bengbu (CN); CHINA NATIONAL BUILDING MATERIAL GROUP CO., LTD., Beijing (CN)

(72) Inventors: Shou Peng, Bengbu (CN); Chong Zhang, Bengbu (CN); Zhiqiang Cao, Bengbu (CN); Nan Zhan, Bengbu (CN); Longyue Jiang, Bengbu (CN); Kui Wu, Bengbu (CN); Liangmao Jin, Bengbu (CN); Changzhen Wang, Bengbu (CN)

(73) Assignees: BENGBU CHINA OPTOELECTRONIC TECHNOLOGY CO., LTD, Bengbu (CN); CNBM RESEARCH INSTITUTE FOR ADVANCED GLASS MATERIALS GROUP CO., LTD, Bengbu (CN); CHINA NATIONAL BUILDING MATERIAL GROUP CO., LTD., Bengbu (CN)

( * ) Notice: Subject to any disclaimer, the term of this patent is extended or adjusted under 35 U.S.C. 154(b) by 0 days.

(21) Appl. No.: 18/255,325

(22) PCT Filed: May 19, 2023

(86) PCT No.: PCT/CN2023/095269
§ 371 (c)(1),
(2) Date: May 31, 2023

(87) PCT Pub. No.: WO2024/012048
PCT Pub. Date: Jan. 18, 2024

(65) Prior Publication Data
US 2024/0170491 A1   May 23, 2024

(30) Foreign Application Priority Data
Jul. 13, 2022   (CN) .......................... 202210827254.5

(51) Int. Cl.
*H10D 86/60* (2025.01)
*B24B 9/10* (2006.01)
(Continued)

(52) U.S. Cl.
CPC ............... *H10D 86/60* (2025.01); *B24B 9/10* (2013.01); *C03B 33/02* (2013.01); *H10D 86/411* (2025.01)

(58) Field of Classification Search
CPC ........ H10D 86/60; H10D 86/411; B24B 9/10; B24B 9/102; B24B 37/10; B24B 7/242;
(Continued)

(56) References Cited

FOREIGN PATENT DOCUMENTS

| CN | 101224946 A | * | 7/2008 | ......... B24B 27/0076 |
|---|---|---|---|---|
| CN | 201224707 Y | * | 4/2009 | ........... B65G 49/068 |

(Continued)

*Primary Examiner* — Mohammed Shamsuzzaman
(74) *Attorney, Agent, or Firm* — Bret E. Field; Bozicevic, Field & Francis LLP

(57) ABSTRACT

A TFT-LCD float glass substrate processing line sequentially divided into a precision cutting and edge grinding working area, surface grinding working area, and inspection and packaging working area is disclosed. In the precision cutting and edge grinding working area, a cold-end cutting device, precision cutting and breaking device, multi-axis edge grinding device, after-edge-grinding cleaning device, (Continued)

first edge inspection machine device, first size measurement device, grinding range measurement device, flipping conveyor belt, and loading frame are sequentially installed. In the surface grinding working area, a bonding machine entry conveyor belt, first vacuum transfer suction cup, bonding machine device, surface grinding device, peeling machine device, second vacuum transfer suction cup, after-surface-grinding cleaning machine, first surface inspection machine device, final cleaning machine, third surface inspection machine device, second edge inspection machine device, second size measurement device, and thickness measurement device are disclosed.

9 Claims, 2 Drawing Sheets

(51) Int. Cl.
*C03B 33/02* (2006.01)
*H10D 86/40* (2025.01)

(58) Field of Classification Search
CPC ......... C03B 33/02; Y02P 40/57; C03C 19/00; C03C 23/0075
See application file for complete search history.

(56) References Cited

FOREIGN PATENT DOCUMENTS

| | | | | | |
|---|---|---|---|---|---|
| CN | 102190426 | A | * | 9/2011 | ........... B65G 49/068 |
| CN | 101224946 | B | * | 5/2012 | ......... B24B 27/0076 |
| CN | 102557413 | A | * | 7/2012 | ........... B65G 49/068 |
| CN | 102822110 | A | | 12/2012 | |
| CN | 109808393 | A | | 5/2019 | |
| CN | 109909868 | A | | 6/2019 | |
| CN | 109926913 | A | | 6/2019 | |
| CN | 109926914 | A | | 6/2019 | |
| CN | 109939999 | A | | 6/2019 | |
| CN | 111558865 | A | | 8/2020 | |
| CN | 112759242 | A | * | 5/2021 | ............. C03B 33/03 |
| CN | 214135309 | U | | 9/2021 | |
| CN | 115196866 | A | | 10/2022 | |
| JP | 2008287118 | A | * | 11/2008 | ......... H10D 86/0214 |
| JP | 2009234870 | A | | 10/2009 | |
| JP | 2011162434 | A | | 8/2011 | |
| JP | 2012230422 | A | * | 11/2012 | ........... B65G 49/068 |
| JP | 2013242575 | A | * | 12/2013 | ........... B65G 49/068 |
| JP | 2014115347 | A | | 6/2014 | |
| KR | 20110092472 | A | | 8/2011 | |
| KR | 101138722 | B1 | * | 4/2012 | ......... B24B 27/0076 |
| KR | 20250090899 | A | * | 6/2025 | ......... G06Q 10/0639 |
| WO | WO2018203516 | A1 | | 11/2018 | |

* cited by examiner

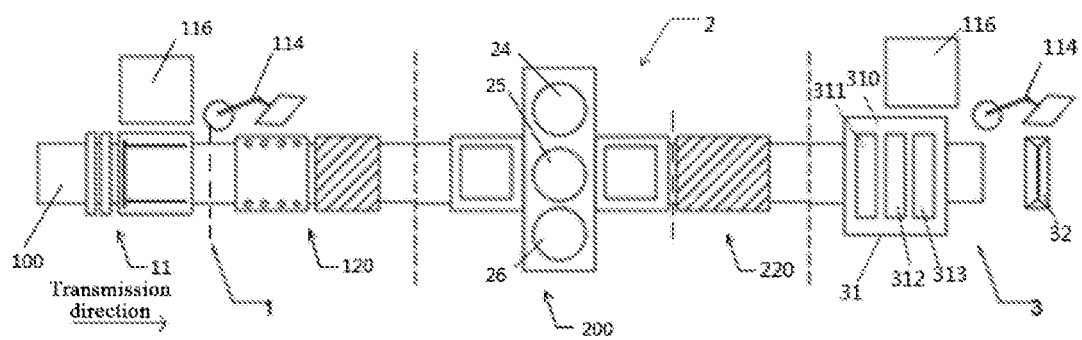
FIG. 1
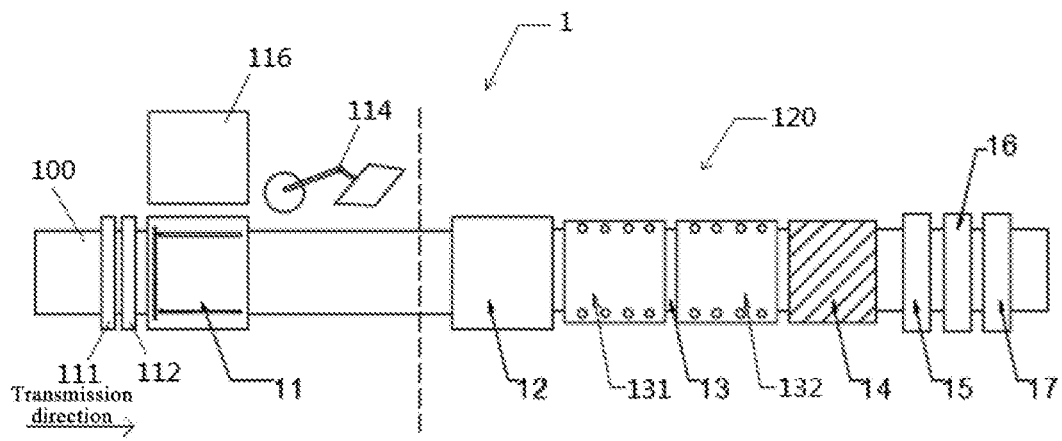
FIG. 2
FIG. 3

TFT-LCD FLOAT GLASS SUBSTRATE PROCESSING LINE

CROSS-REFERENCE TO RELATED APPLICATIONS

The present application is a national phase under 35 U.S.C. § 371 of International Application No. PCT/CN2023/095269, filed May 19, 2023, which claims priority to Chinese patent application No. 202210827254.5 filed with the China National Intellectual Property Administration on Jul. 13, 2022 and entitled "High-generation TFT-LCD float glass substrate processing line", each of which are incorporated herein by reference in their entirety.

TECHNICAL FIELD

The present application relates to the technical field of TFT-LCD float glass substrate processing, and specifically to a TFT-LCD float glass substrate processing line.

BACKGROUND

The TFT-LCD glass substrate is a key strategic material in the electronic information display industry. Currently, the core technology for the production of TFT-LCD glass substrate has been subject to long-term constraints, especially for large-size glass substrates of 8.5 generation, 10.5 generation, and above. The product market is completely monopolized by a few companies such as Corning and Asahi Glass. Currently, TFT-LCD glass substrate production is divided into two types: overflow pull-down method and float method.

With the off-line of float TFT-LCD glass substrate, deep processing technology based on glass substrate has also emerged. Unlike the forming process of overflow pull-down production, the forming process of float production mainly involves the flow of glass liquid on the surface of the metal tin bath, which is then controlled by relevant processes for cooling formation to form a glass substrate. The glass surface in contact with the tin liquid surface is a processing surface of downstream liquid crystal manufacturers. Due to the manufacturing process characteristics of the glass, the processing surface may have micro defects such as tin dots and scratches. However, the downstream liquid crystal panel manufacturers require that the finished glass substrate surface must have no defects such as tin dots and scratches, etc., and the surface must be extremely flat microscopically. This requires the float glass substrate processing line to be different from the processing line of the overflow pull-down method, it has unique combination of processing and production processes to produce glass substrates that meet customer needs.

SUMMARY

The embodiments of the present application aim at providing an efficient, high-precision, and high-yield TFT-LCD float glass substrate processing production line.

An embodiment of the present application proposes a TFT-LCD float glass substrate processing line, which is sequentially divided into a precision cutting and edge grinding working area, a surface grinding working area, and an inspection and packaging working area according to process characteristics and areas. In the precision cutting and edge grinding working area, precision processing and cleaning are performed on an edge of a glass substrate; in the surface grinding working area, precision processing and cleaning are performed on a surface of the glass substrate; and in the inspection and packaging working area, inspection, judgment, and packaging are performed on the glass substrate after the precision processing.

In some embodiments of the present application, a cold-end cutting device, a precision cutting and breaking device, a multi-axis edge grinding device, an after-edge-grinding cleaning device, a first edge inspection machine device, a first size measurement device, a grinding range measurement device, a flipping conveyor belt, and a loading frame are sequentially installed in the precision cutting and edge grinding working area. A bonding machine entry conveyor belt, a first vacuum transfer suction cup, a bonding machine device, a surface grinding device, a peeling machine device, a second vacuum transfer suction cup, an after-surface-grinding cleaning machine, a first surface inspection machine device, a final cleaning machine, a third surface inspection machine device, a second edge inspection machine device, a second size measurement device, and a thickness measurement device are sequentially installed in the surface grinding working area. A buffer inspection bench device, a finished product detection device, an automatic transmission device, a manual spot-check bench, an unloading unit, and a finished product packaging unit are sequentially installed in the inspection and packaging working area.

In some embodiments of the present application, the cold-end cutting device includes a second surface inspection machine device, a thickness detection machine device, a longitudinal cutting machine device, a mechanical arm, an automatic weighing and metering device, and a waste area.

In some embodiments of the present application, the second surface inspection machine device and the thickness detection machine device are equipped with a fully automatic detection system, after cooling, the glass substrate is screened by inspection whether a thickness of the glass substrate is unqualified through the second surface inspection machine device and the thickness detection machine device, to identify an area that meets inspection standards and an area that does not meet the inspection standards.

In some embodiments of the present application, the glass substrate flows into the longitudinal cutting machine device through the automatic transmission device, and the longitudinal cutting machine device partially cuts the area of the glass substrate which meets inspection standards and the area of the glass substrate which does not meet the inspection standards, the area of the glass substrate which meets the inspection standards is cut into a required standard 8.5 generation/10.5 generation/11 generation semi-finished glass substrate by the longitudinal cutting machine device.

In some embodiments of the present application, the automatic weighing and metering device weighs the semi-finished glass substrate flowed in from the longitudinal cutting machine device through the automatic transmission device, and a qualified semi-finished glass substrate automatically flows into the precision cutting and breaking device.

In some embodiments of the present application, the precision cutting and breaking device and the multi-axis edge grinding device perform size recognition based on glass substrate information transmitted in a previous process, and the precision cutting and breaking device and the multi-axis edge grinding device are automatically switched into processing positions for multiple sizes such as for 8.5 generation/10.5 generation/11 generation.

In some embodiments of the present application, the surface grinding device comprises grinding machine tables, each of which comprises an upper grinding disc, a lower tray fixing platform, and an automatic transfer and transmission device, three groups of grinding machine tables are provided, namely a coarse grinding machine, a fine grinding machine, and a precision grinding machine.

In some embodiments of the present application, the coarse grinding machine grinds a glass surface for a first time to remove large particle defects on the surface of the glass substrate, the fine grinding machine grinds the glass surface for a second time to remove small particle defects on the surface of the glass substrate, and the precision grinding machine grinds the glass surface for a third time to repair the surface of the glass substrate.

In some embodiments of the present application, the first surface inspection machine device performs automatic detection and judgment on a surface of the glass substrate, which is divided into three levels: a severely unqualified product, a slightly unqualified product, and a qualified product, the severely unqualified product is transmitted to the waste area for unloading through the automatic transmission device, the slightly unqualified product is transmitted back to the bonding machine entry conveyor belt through the automatic transmission device for re-bonding and re-grinding.

The beneficial effects of the present application:

The TFT-LCD float glass substrate processing line provided in the present application can process large-size TFT-LCD float glass substrates such as 8.5 generation substrates with a size of 2200 mm×2500 mm, 10.5/11 generation substrates with a size of 3370 mm×2940 mm, etc., The cold-end cutting device can automatically switch between different working positions. It has the advantages of high production efficiency, large product size, high product accuracy, excellent product performance, and large production capacity.

BRIEF DESCRIPTION OF THE DRAWINGS

The drawings described herein are used to provide further understanding of the present application, and form a part of the present application. The schematic embodiments and description herein are used to explain the present application and do not constitute improper limitations to the present application.

FIG. 1 is a schematic diagram of the overall structure of a post-processing production line according to an embodiment of the present application;

FIG. 2 is a schematic diagram of the structure of a precision cutting and edge grinding working area according to an embodiment of the present application;

FIG. 3 is a schematic diagram of the structure of a surface grinding working area according to an embodiment of the present application;

REFERENCE SIGNS

Figure 4:
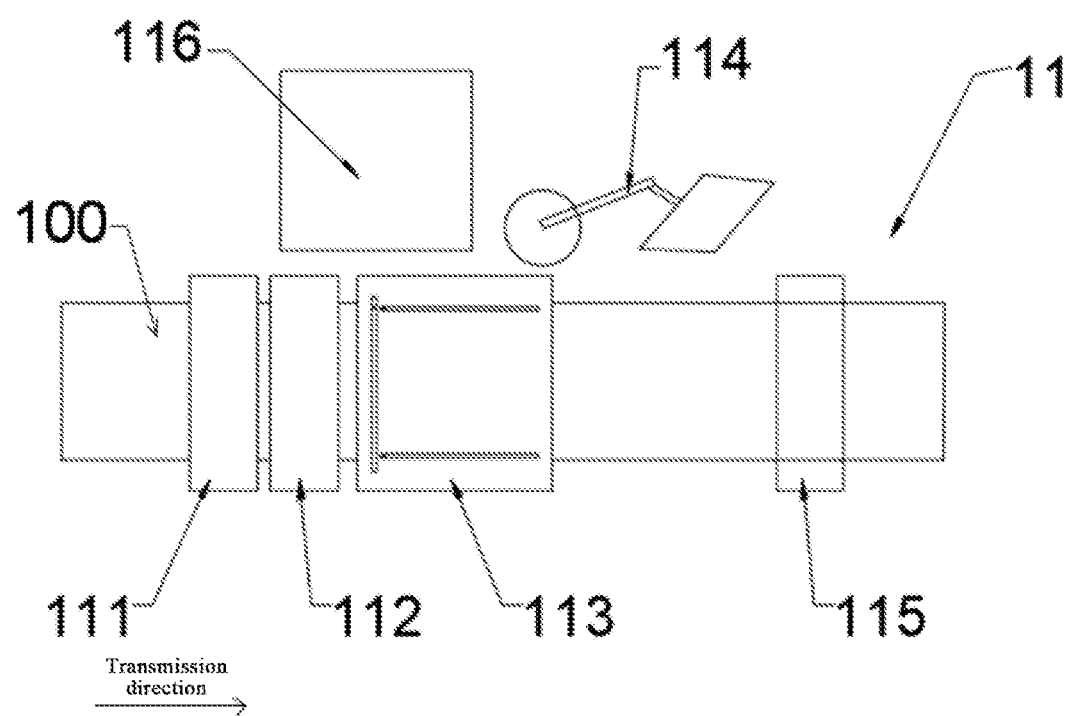
FIG. 4 is a schematic structure diagram of a cold-end cutting device according to an embodiment of the present application.

1—Precision cutting and edge grinding working area; 100—Automatic transmission device; 120—Edge grinding area; 11—Cold-end cutting device; 111—Second surface inspection machine device; 112—Thickness detection machine device; 113—Longitudinal cutting machine device; 114—Mechanical arm; 115—Weighing and metering device; 116—Waste area; 12—Precision cutting and breaking device; 13—Multi-axis edge grinding device; 131—First edge grinding device; 132—Second edge grinding device; 14—After-edge-grinding cleaning device; 15—First edge inspection machine device; 16—First size measurement device; 17—Grinding range measurement device; 2—Surface grinding working area; 200—Grinding area; 220—Cleaning area; 21—Bonding machine entry conveyor belt; 22—First vacuum transfer suction cup; 23—Bonding machine device; 231—Tray; 24—Coarse grinding machine; 25—Fine grinding machine; 26—Precision grinding machine; 27—Peeling machine device; 28—Second vacuum transfer suction cup; 29—After-surface-grinding cleaning machine; 210—First surface inspection machine device; 211—Final cleaning machine; 212—Additional conveyor belt; 3—Inspection and packaging working area; 31—detection area; 310—Buffer inspection bench device; 311—Final edge inspection device; 312—Surface inspection device; 313—Thickness and size measurement device; 32—Packaging area.

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All other embodiments obtained by those of ordinary skills in the art based on the embodiments herein are within the protection scope of the present application.

As shown in FIG. 1, an embodiment of the present application proposes a TFT-LCD float glass substrate processing line, which is sequentially divided into three working areas, i.e., a precision cutting and edge grinding working area 1, a surface grinding working area 2, and an inspection and packaging working area 3 according to process characteristics and areas. These three working areas are sequentially connected and achieve unified and coordinated operations through a matching electrical control system. In the precision cutting and edge grinding working area 1, precision processing and cleaning are performed on an edge of a glass substrate, in the surface grinding working area 2, precision processing and cleaning are performed on a surface of the glass substrate, and in the inspection and packaging working area 3, inspection, judgment, and packaging are performed on the glass substrate after the precision processing.

The TFT-LCD float glass substrate processing line provided in the present application can process large-size TFT-LCD float glass substrates such as 8.5 generation substrates with a size of 2200 mm×2500 mm, 10.5/11 generation substrates with a size of 3370 mm×2940 mm, etc., which improves the cold-end cutting device, which can automatically switch between different working positions. It has the advantages of high production efficiency, large product size, high product accuracy, excellent product performance, and large production capacity.

Compared with the processing line with an overflow pull-down method, the technical solution of the present application arranges a surface grinding working area between the edge grinding working area and the inspection and packaging working area. Before performing inspection and packaging, precision processing such as grinding and cleaning are performed on the surface of the glass substrate, so that the surface of the produced glass substrate can meet microscopically extremely flat requirements required by downstream processing.

As shown in FIG. 1, an automatic transmission device 100 is used for the transmission between the precision cutting and edge grinding working area 1 and the surface grinding working area 2, and between the surface grinding working area 2 and the final inspection and packaging working area 3. The automatic transmission device 100 is a commonly used transmission device in glass substrate production lines. FIG. 1 only shows a portion of the conveyor belt of the automatic transmission device 100, and does not show components such as electrical control components and conveyor belt drive components of the automatic transmission device 100.

As shown in FIG. 1, the precision cutting and edge grinding working area 1 is arranged with a cold-end cutting device 11 and an edge grinding area 120 sequentially along the transmission direction of the conveyor belt. After the glass substrate is formed, annealed and cooled, it is first cut laterally and on both sides by the cold-end cutting device 11, and then ground on cutting sections and sections on both sides through the edge grinding area 120. The glass substrate after edge grinding is transmitted to the surface grinding working area 2 by the conveyor belt. The surface grinding working area 2 is arranged with a grinding area 200 and a cleaning area 220 sequentially along the transmission direction of the conveyor belt. The surface of the glass substrate is ground multiple times in the grinding area 200, and the ground glass substrate enters the cleaning area 220 for cleaning. The cleaned glass substrate is transmitted to the inspection and packaging working area 3 by the conveyor belt. The inspection and packaging working area 3 is arranged with a detection area 31 and a packaging area 32 sequentially along the transmission direction of the conveyor belt. Glass substrates that pass the inspection in the detection area 31 enter the packaging area 32 for packaging, and glass substrates that fail the inspection are picked up by a mechanical arm 114 and placed in the waste area 116 for unloading.

As shown in FIG. 2, in one embodiment of the present application, after the glass substrate is formed, annealed, and cooled, the precision cutting and edge grinding working area 1 is sequentially installed with a cold-end cutting device 11, a precision cutting and breaking device 12, a multi-axis edge grinding device 13, an after-edge-grinding cleaning device 14, a first edge inspection machine device 15, a first size measurement device 16, a grinding range measurement device 17, a flipping conveyor belt, and a loading frame.

Specifically, a cold-end cutting device 11, a precision cutting and breaking device 12, a multi-axis edge grinding device 13, an after-edge-grinding cleaning device 14, a first edge inspection machine device 15, a first size measurement device 16, a grinding range measurement device 17 can be sequentially arranged in the precision cutting and edge grinding working area 1 along the transmission direction of the conveyor belt. In this way, after the glass substrate is formed, annealed, and cooled, it enters the precision cutting and edge grinding working area 1. The glass substrate is first cut laterally and on both sides by the cold-end cutting device 11, and then is broke on lateral cutting sections and sections on both sides by the precision cutting and breaking device 12, and the cut glass substrate is retained. The cut glass substrate is ground on the lateral edges by the first edge grinding device 131 of the multi-axis edge grinding device 13, and then is ground on both side edges by the second edge grinding device 132. After grinding the glass substrate, it enters the after-edge-grinding cleaning device 14 for cleaning. The cleaned glass substrate enters the first edge inspection machine device 15 for edge inspection. After passing the edge inspection, it enters the first size measurement device 16 for size measurement. After passing the size measurement, it enters the grinding range measurement device 17, and after passing the inspection, it can be transmitted to the surface grinding working area 2 for surface grinding.

During the edge grinding and cleaning process mentioned above, the position of the glass substrate can be adjusted through the flipping conveyor belt and the loading frame of the automatic transmission device 100, so that the lateral or side edges to be ground are ground in correspondence to grinding axis positions of the first edge grinding device 131 or the second edge grinding device 132, or the glass substrate is moved to the after-edge-grinding cleaning device 14.

As shown in FIG. 4, the cold-end cutting device 11 includes a second surface inspection machine device 111, a thickness detection machine device 112, a longitudinal cutting machine device 113, a mechanical arm 114, an automatic weighing and metering device 115, and a waste area 116.

The second surface inspection machine device 111 performs inspection on the surface of the formed and annealed glass substrate, and marks whether there are defects. The second surface inspection machine device 111 and the thickness detection machine device 112 are equipped with a fully automatic detection system. After cooling, the glass substrate is screened by inspection whether the thickness of the glass substrate is unqualified through the second surface inspection machine device 111 and the thickness detection machine device 112, to identify an area that meets inspection standards and an area that does not meet the inspection standards.

After initial inspection of the glass substrate, the glass substrate flows into the longitudinal cutting machine device 113 through the automatic transmission device, and the longitudinal cutting machine device 113 partially cuts the area of the glass substrate which meets the inspection standards and the area of the glass substrate which does not meet the inspection standards, the area of the glass substrate which meets the inspection standards is cut into a required standard 8.5 generation/10.5 generation/11 generation semi-finished glass substrate by the longitudinal cutting machine device 113, to reduce glass substrate waste.

The unqualified glass substrates are picked up by the mechanical arm 114 and placed in the waste area 116 for unloading.

The automatic weighing and metering device 115 weighs the semi-finished glass substrate flowed in from the longitudinal cutting machine device 113 through the automatic transmission device, and a qualified semi-finished glass substrate automatically flows into the precision cutting and breaking device 12 for a precision cutting and edge grinding process, and an unqualified semi-finished glass substrate automatically flows into the waste area 116 for unloading. The weight of the glass substrate is a reference standard for inspecting whether the product is qualified. In order to ensure the quality of the final product, the weight is weighed in this embodiment.

As shown in FIG. 2, the precision cutting and breaking device 12 performs precision cutting on large-size glass substrates such as 8.5 generation/10.5 generation/11 generation. After the glass substrate is preliminarily cut by the cold-end cutting device 11, it is positioned and transmitted by the conveyor belt of the automatic transmission device 100 to the working position of the precision cutting and breaking device 12.

The multi-axis edge grinding device 13 performs edge grinding and chamfering on the glass substrate that has completed precision cutting, and has large-size automatic switching functions such as 8.5 generation/10.5 generation/11 generation.

The precision cutting and breaking device 12 and the multi-axis edge grinding device 13 perform size recognition based on glass substrate information transmitted in a previous process, and the precision cutting and breaking device 12 and the multi-axis edge grinding device 13 are automatically switched into processing positions for multiple sizes such as for 8.5 generation/10.5 generation/11 generation.

The after-edge-grinding cleaning device 14 performs cleaning on residual glass powder caused by edge grinding and the surface of the glass substrate.

The first edge inspection machine device 15 performs automatic detection to determine whether the four edges and chamfers of the glass substrate are qualified.

The first size measurement device 16 performs size measurement, detection and judgment on the glass substrate.

The grinding range measurement device 17 performs automatic detection and judgment on the grinding range of the four edges and chamfers.

After the glass substrate performs processes such as positioning, precision cutting, breaking, edge grinding, chamfering, cleaning, edge detection, grinding range detection, size measurement, etc., the unqualified glass substrate automatically flows into the waste area 116 for unloading, the qualified glass substrate is input into the surface grinding working area 2 through the conveyor belt for further processing and production.

In the technical solution of the present application, the precision cutting and breaking device 12, the multi-axis edge grinding device 13, the after-edge-grinding cleaning device 14, the first edge inspection machine device 15, the first size measurement device 16, and the grinding range measurement device 17 in the precision cutting and edge grinding working area 1 are reasonably combined according to the process sequence, which can improve the grinding accuracy of each edge of the glass substrate.

As shown in FIG. 3, the glass substrate performs post-processing production through the precision cutting and edge grinding working area 1. The qualified glass substrate is input into the surface grinding working area 2 through a conveyor belt. According to the size of the input glass substrate, the devices in the surface grinding working area 2 is automatically switched into the corresponding working position.

Specifically, in the embodiment shown in FIG. 3, a bonding machine entry conveyor belt 21, a first vacuum transfer suction cup 22, a bonding machine device 23, a surface grinding device, a peeling machine device 27, a second vacuum transfer suction cup 28, an after-surface-grinding cleaning machine 29, a first surface inspection machine device 210, a final cleaning machine 211, a third surface inspection machine device, a second edge inspection machine device, a second size measurement device, and a thickness measurement device are sequentially installed in the surface grinding working area 2.

The glass substrate is transmitted to the bonding machine entry conveyor belt 21 by the automatic transmission device 100, and the bonding machine entry conveyor belt 21 performs positioning on the input glass substrate.

The first vacuum transfer suction cup 22 then performs vacuum adsorbing on the surface of the positioned glass substrate and moves it onto the bonding machine device 23.

The bonding machine device 23 is used to bond the glass substrate with a tray 231.

The tray 231 that carries the glass substrate is transmitted into the surface grinding device. The surface grinding device usually includes grinding machine tables, each of which includes an upper grinding disc, a lower tray fixing platform, and an automatic transfer and transmission device. The grinding machine tables use different types of grinding discs and different grinding processes according to process requirements, and the tray is transmitted through the automatic transfer and transmission device. Wherein the automatic transfer and transmission device is a mechanism that the tray carrying the glass substrate is transmitted inside the surface grinding device, which is connected with the bonding machine device to transmit the tray carrying the glass substrate between different types of grinding discs.

In this embodiment as shown in FIG. 3, three groups of grinding machine tables can be provided, namely a coarse grinding machine 24, a fine grinding machine 25, and a precision grinding machine 26. In this embodiment, the coarse grinding machine 24, the fine grinding machine 25, and the precision grinding machine 26 can be arranged in turn along the direction of the conveyor belt. In other embodiments, as shown in FIG. 1, the coarse grinding machine 24, the fine grinding machine 25, and the precision grinding machine 26 can be arranged in parallel, and the glass substrate can be moved to the coarse grinding machine 24, the fine grinding machine 25, or the precision grinding machine 26 through the automatic transfer and transmission device. Wherein, the coarse grinding machine 24 grinds a glass surface for the first time to remove large particle defects on the surface of the glass substrate;

the fine grinding machine 25 grinds the glass surface for the second time to remove small particle defects on the surface of the glass substrate;

the precision grinding machine 26 grinds the glass surface for the third time to repair the surface of the glass substrate;

the peeling machine device 27 separates the glass substrate from the tray.

As shown in FIG. 3, the second vacuum transfer suction cup 28 performs vacuum adsorbing on the separated glass substrate and moves it onto the after-surface-grinding cleaning machine 29.

The after-surface-grinding cleaning machine 29 performs cleaning on surface particles of the glass substrate and residual grinding fluid.

The first surface inspection machine device 210 performs automatic detection and judgment on the surface of the glass substrate, which is divided into three levels: a severely unqualified product, a slightly unqualified product, and a qualified product, the severely unqualified product is transmitted to the waste area 116 for unloading through the automatic transmission device, the slightly unqualified product is transmitted back to the bonding machine entry conveyor belt 21 through the automatic transmission device for re-bonding and re-grinding. For example, as shown in FIG. 3, the slightly unqualified products can be transmitted back to the bonding machine entry conveyor belt 21 through an additional conveyor belt 212 for re-bonding and re-grinding.

In the embodiment shown in FIG. 3, the final cleaning machine 211 is equipped with several track roller brushes and several medicated liquid cleaning agents to clean the glass substrate.

As shown in FIG. 3, after the glass substrate enters the surface grinding working area 2, the surface grinding device completes coarse grinding, fine grinding, and precision grinding on the glass substrate. It is transmitted through the automatic transmission device, which are sequentially subject to wet area wetting, tray positioning, peeling, cleaning, and surface detection. It is then transmitted through the automatic transmission device to the first surface inspection machine device 210 for automatic detection on the surface of the glass substrate. Based on the surface inspection results, the quality of the ground glass substrate is automatically classified. The severely unqualified glass substrates are transmitted to the waste area 116 for unloading through the automatic transmission device, the slightly unqualified glass substrates are transmitted back to the bonding machine through the automatic transmission device for re-bonding and re-grinding. The qualified glass substrates are transmitted to the final cleaning machine 211 through the automatic transmission device, the final cleaning machine 211 performs final cleaning and air drying on the glass substrate. After the glass substrate is cleaned and air dried, it is transmitted to the final inspection for final detection and judgment through the automatic transmission device.

After ground and cleaned in the surface grinding working area 2, the glass substrate is transmitted to the inspection and packaging working area 3 through the conveyor belt of the automatic transmission device.

A buffer inspection bench device, a finished product detection device, an automatic transmission device, a manual spot-check bench, an unloading unit, and a finished product packaging unit are sequentially installed in the inspection and packaging working area 3.

As shown in FIG. 1, the inspection and packaging working area 3 includes a detection area 31, a packaging area 32, a waste area 116, and a mechanical arm 114.

The finished product detection device is provided on the buffer inspection bench device 310 in the detection area 31. The finished product detection device can include a final edge inspection device 311, a surface inspection device 312, and a thickness and size measurement device 313.

The packaging area 32 is equipped with the finished product packaging unit, that is, a packaging unit for a finished product of glass substrate that pass the finished product inspection. The unqualified glass substrates are moved to the waste area 116 through the unloading unit, as shown in FIG. 1, the unqualified glass substrates are picked up by the mechanical arm 114 and placed in the waste area 116.

In this embodiment, after the qualified glass substrates that pass the inspection by the first surface inspection machine device 210 in the surface grinding working area 2 is input into the inspection and packaging working area 3 through the automatic transmission device, the glass substrate passes through the buffer inspection bench device, the finished product detection device, and the automatic transmission device. A spot-check conveyor belt is provided behind the finished product detection device, and is connected to the manual spot-check bench. The finished product detection device performs final edge inspection, surface inspection, thickness and size measurement on the finished glass substrate. The finished product detection device is equipped with a fully automatic detection system, and the products that are determined as unqualified after detection are transmitted to the unloading unit through the automatic transmission device. The unloading unit is equipped with an unloading robot, which can have a mechanical arm 114 as shown in FIG. 1. The qualified products that are determined as qualified after detection are transmitted to the finished product packaging unit through the automatic transmission device, and the finished product packaging unit is equipped with a paper loading robot, a sheet picking robot, and a finished product packaging rack; finally, the finished product packaging rack is used for sealing and packaging.

Starting from the forming and annealing of glass substrate, this production line covers initial inspection, precision cutting, edge grinding, after-edge-grinding cleaning, edge inspection, surface grinding, after-surface-grinding cleaning, final cleaning, final inspection, packaging, and post-processing until the production of finished products.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A TFT-LCD float glass substrate processing line, which is sequentially divided into a precision cutting and edge grinding working area, a surface grinding working area, and an inspection and packaging working area according to process characteristics and areas, wherein, in the precision cutting and edge grinding working area, precision processing and cleaning are performed on an edge of a glass substrate; in the surface grinding working area, precision processing and cleaning are performed on a surface of the glass substrate; and in the inspection and packaging working area, inspection, judgment, and packaging are performed on the glass substrate after the precision processing;

wherein a cold-end cutting device in the precision cutting and edge grinding working area identifies an area that meets inspection standards and an area that does not meet the inspection standards and the area of the glass substrate which meets the inspection standards is cut into a required standard 8.5 generation/10.5 generation/11 generation semi-finished glass substrate;

wherein a surface grinding device in the surface grinding working area repairs a surface of the glass substrate for three times; and wherein a first surface inspection machine device in the surface grinding working area performs automatic detection and judgment on the surface of the glass substrate, which is divided into three levels: a severely unqualified product, a slightly unqualified product, and a qualified product, the severely unqualified product is transmitted to an waste area of the cold-end cutting device for unloading through an automatic transmission device in the inspection and packaging working area, the slightly unqualified product is transmitted back to an bonding machine entry conveyor belt in the surface grinding working area through the automatic transmission device for re-bonding and re-grinding.

2. The TFT-LCD float glass substrate processing line of claim 1, wherein, the cold-end cutting device, a precision cutting and breaking device, a multi-axis edge grinding device, an after-edge-grinding cleaning device, a first edge inspection machine device, a first size measurement device, a grinding range measurement device, a flipping conveyor belt, and a loading frame are sequentially installed in the precision cutting and edge grinding working area;

the bonding machine entry conveyor belt, a first vacuum transfer suction cup, a bonding machine device, the surface grinding device, a peeling machine device, a second vacuum transfer suction cup, an after-surface-grinding cleaning machine, the first surface inspection machine device, a final cleaning machine, a third surface inspection machine device, a second edge inspection machine device, a second size measurement device, and a thickness measurement device are sequentially installed in the surface grinding working area; a buffer inspection bench device, a finished product detection device, the automatic transmission device, a manual spot-check bench, an unloading unit, and a finished product packaging unit are sequentially installed in the inspection and packaging working area.

3. The TFT-LCD float glass substrate processing line of claim 2, wherein the cold-end cutting device comprises a second surface inspection machine device, a thickness detection machine device, a longitudinal cutting machine device, a mechanical arm, an automatic weighing and metering device, and the waste area.

4. The TFT-LCD float glass substrate processing line of claim 3, wherein the second surface inspection machine device and the thickness detection machine device are equipped with a fully automatic detection system; after cooling, the glass substrate is screened by inspection whether a thickness of the glass substrate is unqualified through the second surface inspection machine device and the thickness detection machine device, to identify the area that meets inspection standards and an area that does not meet the inspection standards.

5. The TFT-LCD float glass substrate processing line of claim 3, wherein the glass substrate flows into the longitudinal cutting machine device through the automatic transmission device, and the longitudinal cutting machine device partially cuts the area of the glass substrate which meets the inspection standards and the area of the glass substrate which does not meet the inspection standards by the longitudinal cutting machine device.

6. The TFT-LCD float glass substrate processing line of claim 3, wherein the automatic weighing and metering device weighs the semi-finished glass substrate flowed in from the longitudinal cutting machine device through the automatic transmission device, and a qualified semi-finished glass substrate automatically flows into the precision cutting and breaking device.

7. The TFT-LCD float glass substrate processing line of claim 3, wherein the precision cutting and breaking device and the multi-axis edge grinding device perform size recognition based on glass substrate information transmitted in a previous process, and the precision cutting and breaking device and the multi-axis edge grinding device are automatically switched into processing positions for multiple sizes such as for the 8.5 generation/10.5 generation/11 generation semi-finished glass substrate.

8. The TFT-LCD float glass substrate processing line of claim 2, wherein the surface grinding device comprises grinding machine tables, each of which comprises an upper grinding disc, a lower tray fixing platform, and an automatic transfer and transmission device, three groups of grinding machine tables are provided, namely a coarse grinding machine, a fine grinding machine, and a precision grinding machine.

9. The TFT-LCD float glass substrate processing line of claim 8, wherein the coarse grinding machine grinds a glass surface for a first time to remove large particle defects on the surface of the glass substrate, the fine grinding machine grinds the glass surface for a second time to remove small particle defects on the surface of the glass substrate, and the precision grinding machine grinds the glass surface for a third time to repair the surface of the glass substrate.

* * * * *